United States Patent
Yokoyama et al.

(10) Patent No.: US 6,535,679 B2
(45) Date of Patent: *Mar. 18, 2003

(54) OPTICAL FIBER AND METHOD OF MANUFACTURING THE SAME

(75) Inventors: Yoshio Yokoyama, Yokohama (JP); Akira Urano, Yokohama (JP); Toshio Danzuka, Yokoyama (JP)

(73) Assignee: Sumitomo Electric Industries, Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/007,798

(22) Filed: Jan. 15, 1998

(65) Prior Publication Data

US 2001/0043782 A1 Nov. 22, 2001

(30) Foreign Application Priority Data

Jan. 16, 1997 (JP) .............................................. 9-005671
Jan. 16, 1997 (JP) .............................................. 9-005676

(51) Int. Cl.$^7$ .......................... G02B 6/22; C03B 37/018
(52) U.S. Cl. ......................... 385/127; 385/126; 65/413; 65/414; 65/415
(58) Field of Search ................................ 385/126, 127; 65/397, 399, 413–416, 421, 385, 405

(56) References Cited

U.S. PATENT DOCUMENTS

| | | | | |
|---|---|---|---|---|
| 4,062,665 A | * | 12/1977 | Izawa et al. | ...................... 65/3 |
| 4,414,012 A | * | 11/1983 | Suto et al. | ................... 65/18.2 |
| 4,568,370 A | | 2/1986 | Powers | ........................ 65/3.11 |
| 4,822,399 A | * | 4/1989 | Kanamori et al. | ........... 65/3.12 |
| 4,852,968 A | | 8/1989 | Reed | |
| 4,974,932 A | * | 12/1990 | Nattermann et al. | ........ 385/124 |

(List continued on next page.)

FOREIGN PATENT DOCUMENTS

| EP | 327702 | 8/1989 |
|---|---|---|
| EP | 0 327 702 | 8/1989 |

(List continued on next page.)

OTHER PUBLICATIONS

Patent Abstracts of Japan, Kobayashi, "1.55MUM Dispersion Shift Fiber", vol. 15, No. 188 (P–1201), May 15, 1991 & JP 03 044604 A (Fujikura Ltd), Feb. 26, 1991.

(List continued on next page.)

*Primary Examiner*—Rodney Bovernick
*Assistant Examiner*—Juliana K. Kang
(74) *Attorney, Agent, or Firm*—McDermott, Will & Emery

(57) ABSTRACT

In an optical fiber of this invention, the MFD is increased to effectively suppress the influence of nonlinear optical effects. A method of manufacturing the optical fiber effectively prevents bubble occurrence in a transparent preform, deformation of the preform, and flaws on the preform surface during the manufacture. The optical fiber has, from its center to the peripheral portion, a first core having a first refractive index $n_1$, a second core having a second refractive index $n_2$ ($<n_1$), a first cladding having a third refractive index $n_3$ ($<n_2$), and a second cladding having a fourth refractive index $n_4$ ($>n_3$, $<n_2$). The outer diameter of the second core is set to be 25 to 40 μm. Specifically, the refractive indices of the first and second claddings of the optical fiber preferably increase in the radial direction from the inner side thereof to the peripheral side thereof. This structure is obtained by adjusting the supply amount of a fluorine material in the manufacturing process of preform regions corresponding to first and second claddings such that the contents of fluorine decreases in the radial direction.

18 Claims, 8 Drawing Sheets

U.S. PATENT DOCUMENTS

| | | | | |
|---|---|---|---|---|
| 5,048,923 A | * | 9/1991 | Tsumanuma et al. | 385/117 |
| 5,238,479 A | * | 8/1993 | Ohga et al. | 65/3.12 |
| 5,559,921 A | | 9/1996 | Terasawa et al. | 385/124 |
| 5,597,398 A | * | 1/1997 | Ishikawa et al. | 65/413 |
| 5,674,306 A | * | 10/1997 | Hoshino et al. | 65/385 |
| 5,676,725 A | * | 10/1997 | Ito et al. | 65/382 |
| 5,721,800 A | * | 2/1998 | Kato et al. | 385/127 |
| 5,732,178 A | * | 3/1998 | Terasawa et al. | 385/127 |
| 5,755,849 A | * | 5/1998 | Hoshino et al. | 65/381 |
| 5,822,488 A | * | 10/1998 | Terasawa et al. | 385/127 |
| 5,852,701 A | * | 12/1998 | Kato et al. | 385/127 |
| 5,895,515 A | * | 4/1999 | Ishikawa et al. | 65/377 |

FOREIGN PATENT DOCUMENTS

| | | | |
|---|---|---|---|
| EP | 689068 | | 12/1995 |
| EP | 785448 | | 7/1997 |
| JP | 62-80607 | | 4/1987 |
| JP | 62-187305 | | 8/1987 |
| JP | 63-208005 | | 8/1988 |
| JP | 3-44604 | * | 2/1991 |

OTHER PUBLICATIONS

Patent Abstracts of Japan, Horiguchi, "Dual Core Single Mode Optical Fiber with Refractive Index Groove", vol. 12, No. 34 (P–662), Feb. 2, 1988 & JP 62 187305 A (Nippon Telegr & Teleph Corp), Aug. 15, 1987.

MoB.3.2 22nd European Conference on Optical Communication—ECOC'96, Oslo New Dispersion Shifted Fiber with Effective Area Larger Than 90 $\mu m2$, pp. 1.49–1.52, P. Nouchi et al.

* cited by examiner

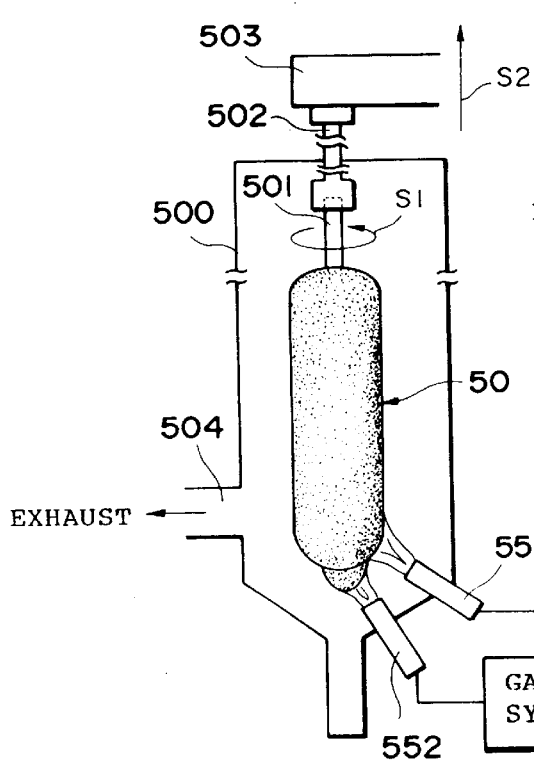
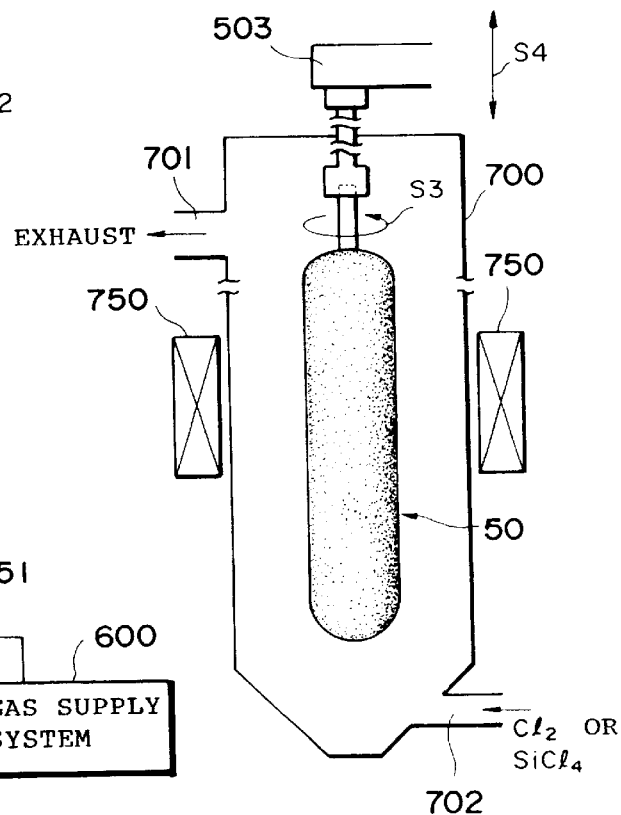
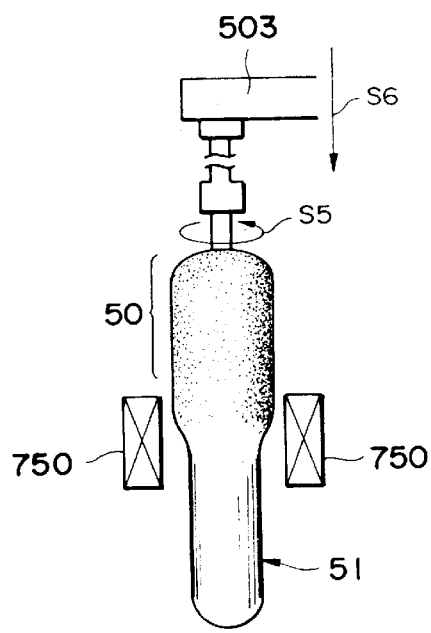

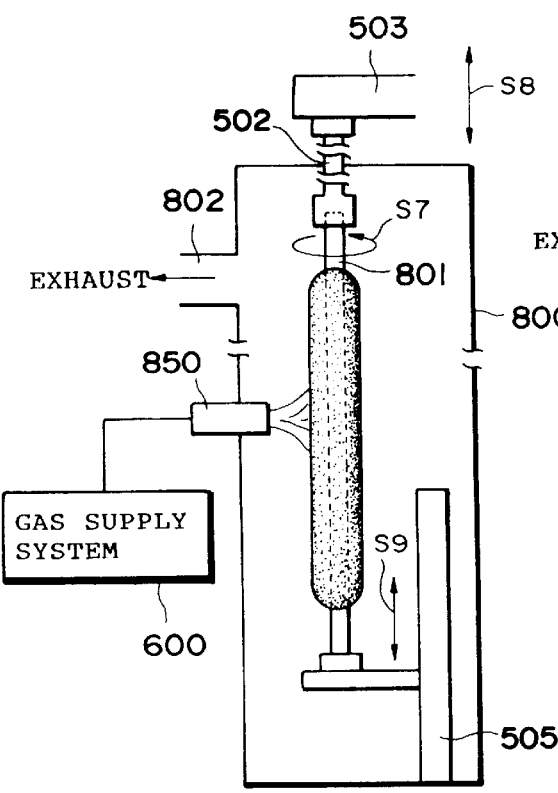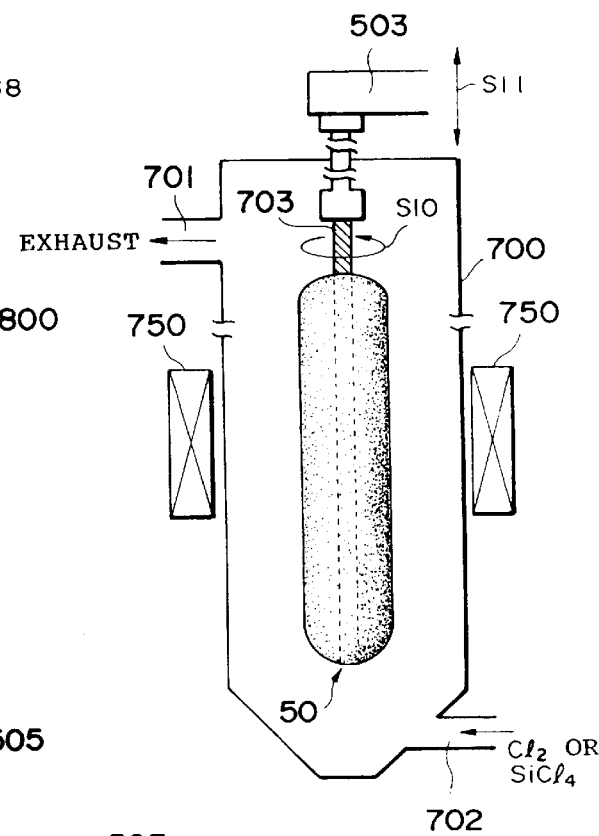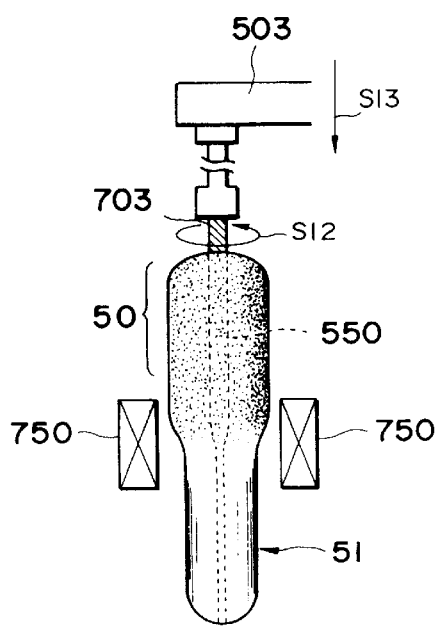

OPTICAL FIBER AND METHOD OF MANUFACTURING THE SAME

BACKGROUND OF THE INVENTION

1. Field of the Invention

The present invention relates to an optical fiber which can be applied to a long-haul large-capacity optical communication system and, more particularly, to a dispersion-shifted fiber which is suitable for wavelength division multiplexing (WDM) communication and whose zero-dispersion wavelength is set within a desired range.

2. Related Background Art

A conventional optical communication system to which a single-mode optical fiber is applied as a transmission line often uses light in a 1.3- or 1.55-$\mu$m wavelength band as communication signal light. Recently, however, use of light in a 1.55-$\mu$m wavelength band increases from the viewpoint of a reduction in transmission loss in the transmission line. In particular, for a single-mode optical fiber (to be referred to as a 1.55-$\mu$m single-mode optical fiber hereinafter) applied to a transmission line for light in the 1.55-$\mu$m wavelength band, since the transmission loss in a silica-based single-mode optical fiber is minimized for light in the 1.55-$\mu$m wavelength band, the wavelength dispersion (phenomenon that a pulse wave spreads due to the light propagation speed difference depending on wavelengths) is also designed to be zero for light in the 1.55-$\mu$m wavelength band. Such a 1.55-$\mu$m single-mode optical fiber whose zero-dispersion wavelength is shifted near the 1.55-$\mu$m wavelength band is generally called a dispersion-shifted fiber.

As a conventional dispersion-shifted fiber, the sectional structure and composition of a dispersion-shifted fiber whose zero-dispersion wavelength is shifted near 1.55 $\mu$m, and a method of manufacturing the same are disclosed in, e.g., Japanese Patent No. 2533083 (first prior art). The dispersion-shifted fiber of the first prior art has an inner core made of $GeO_2$—$SiO_2$ ($SiO_2$ containing germanium dioxide), an outer core made of $SiO_2$, and a cladding made of F—$SiO_2$ ($SiO_2$ containing fluorine). The refractive index profile of the dispersion-shifted fiber of the first prior art is a so-called matched type profile which has no depressed part in a portion corresponding to the cladding. In this specification, an optical fiber having this matched type profile will be referred to as a matched fiber. On the other hand, a refractive index profile having a depressed part in a portion corresponding to the cladding is called a depressed cladding type profile. In this specification, an optical fiber having this depressed cladding type profile will be particularly referred to as a depressed fiber. In the structure of the dispersion-shifted fiber of the first prior art, only setting of the zero-dispersion wavelength near 1.55 $\mu$m can be realized.

Japanese Patent Laid-Open No. 63-208005 (second prior art) discloses a dispersion-shifted fiber having a depressed cladding type profile, which has, around a core, a first cladding having a refractive index lower than that of the core, and, around the first cladding, a second cladding having a refractive index higher than that of the first cladding. The object of the dispersion-shifted fiber of the second prior art is to suppress wavelength dispersion over a wide wavelength band of 1.3 to 1.5 $\mu$m.

SUMMARY OF THE INVENTION

In recent years, extensive studies of construction of high-speed large-capacity transmission systems have been made, and particularly, transmission systems employing wavelength division multiplexing (WDM) have received a great deal of attention. In this scheme, a plurality of signal light components having different wavelengths are simultaneously transmitted through one transmission line, so the quantity of data which can be transmitted largely increases.

To realize such a transmission system, various new specifications are required of an optical fiber to be used as a transmission line. The above-mentioned conventional dispersion-shifted fiber cannot cope with the requirements anymore.

The present inventors have examined the conventional dispersion-shifted fiber and found the following problems. The mode field diameter (MFD) of the conventional dispersion-shifted fiber is about 8 $\mu$m. When the power of signal light increases, the influence of nonlinear optical effects tends to be generated. In addition, a variation in wavelength dispersion among various dispersion-shifted fibers applied to a transmission system is large. For this reason, when the signal light wavelength matches the zero-dispersion wavelength of the optical fiber, noise tends to be generated due to four-wave mixing as a nonlinear optical effect.

The nonlinear optical effect is a phenomenon that a signal light pulse is distorted as, e.g., the density of light intensity increases, and this is a major factor for restricting the transmission rate.

When, e.g., fluorine is added to adjust the refractive index of silica glass as a major component of the optical fiber, bubbles may be formed in the preform, or the preform itself may deform in sintering (making the preform transparent) the porous preform of the optical fiber. Flaws formed on the transparent glass surface (preform surface) due to the added impurity may break the optical fiber at the time of drawing.

The present invention has been made to solve the above problems, and has as its object to provide an optical fiber having a large MFD and a structure for effectively suppressing the influence of nonlinear optical effects, and a method of manufacturing the same which effectively prevents bubble occurrence in a transparent preform, deformation of the preform, and flaws on the preform surface during the manufacture of the optical fiber (drawing process).

An optical fiber according to the present invention is a dispersion-shifted fiber whose MFD is 8.6 $\mu$m or more, and preferably, 9 $\mu$m or more, and whose zero-dispersion wavelength is shifted to the long or short wavelength side of 1.55 $\mu$m, i.e., a typical signal light wavelength. The optical fiber is a single-mode optical fiber mainly containing silica glass. In this dispersion-shifted fiber, the zero-dispersion wavelength is shifted from the signal light wavelength by a predetermined amount to intentionally generate wavelength dispersion and suppress the influence of nonlinear optical effects. Therefore, a transmission system which allows variations in zero-dispersion wavelength among dispersion-shifted fibers can be constructed.

According to the first embodiment according to the present invention, there is provided an optical fiber comprising a first core 10 (inner core) having a first refractive index $n_1$, a second core 20 (outer core) provided around an outer periphery of the inner core 10 and having a second refractive index $n_2$ lower than the first refractive index $n_1$, a first cladding 30 (inner cladding) provided around an outer periphery of the outer core 20 and having a third refractive index $n_3$ lower than the second refractive index $n_2$, and a second cladding 40 (outer cladding) provided around an outer periphery of the inner cladding 30 and having a fourth refractive index $n_4$ higher than the third refractive index $n_3$ and lower than the second refractive index $n_2$, as shown in FIG. 1.

In particular, an optical fiber 1 according to the first embodiment has a depressed cladding type profile, as is apparent from the above-described structure. The outer core 20 has an outer diameter of 25 to 40 μm.

This depressed cladding type profile can be realized when the following basic composition is employed: the inner core 10 is made of silica glass containing at least germanium dioxide as an index increaser ($GeO_2$—$SiO_2$); the outer core 20, silica glass essentially containing no germanium dioxide ($SiO_2$) or silica glass containing germanium dioxide ($GeO_2$—$SiO_2$); the inner cladding 30, silica glass containing at least fluorine (index reducer) (F—$SiO_2$); and the outer cladding 40, silica glass containing at least fluorine (F—$SiO_2$). When the sectional area (plane perpendicular to the signal light propagation direction) of the outer core 20 is increased, as in this optical fiber (the outer diameter is 25 to 40 μm), and $GeO_2$ is doped in the outer core 20, the refractive index profile can hardly be flattened in the radial direction of the outer core 20. For this reason, the outer core 20 preferably contains no germanium dioxide.

According to the first embodiment according to the present invention, there is provided a method of manufacturing the optical fiber 1, comprising the first step of forming, by vapor phase synthesis, a porous preform (soot preform) whose central portion along a longitudinal direction corresponds to the inner core 10 and whose peripheral portion around the central portion corresponds to the outer core 20, the second step of sintering the porous preform to obtain a core glass preform, the third step of elongating the core glass preform obtained in the second step to a desired outer diameter and depositing a first porous glass body (soot body) corresponding to the inner cladding 30 on an outer surface of the elongated core glass preform by vapor phase synthesis to obtain a first composite preform, the fourth step of sintering the first composite preform obtained in the third step in an atmosphere containing a fluorine raw material to obtain an intermediate preform, the fifth step of elongating the intermediate preform obtained in the fourth step to a desired outer diameter and depositing a second porous glass body (soot body) corresponding to the outer cladding 40 on an outer surface of the elongated intermediate preform by vapor phase synthesis to obtain a second composite preform, the sixth step of sintering the second composite preform obtained in the fifth step to obtain an optical fiber preform, and the seventh step of drawing the optical fiber preform obtained in the sixth step while heating one end of the optical fiber preform. Sintering of the second composite preform in the sixth step is performed in an atmosphere containing a fluorine raw material.

In the method of manufacturing the optical fiber of the first embodiment, since the outer diameter of the outer core 20 of the optical fiber 1 to be manufactured is as large as 25 to 40 μm, glass synthesis (third step) of the first porous glass body as the inner cladding 30 and glass synthesis (fifth step) of the second porous glass body as the outer cladding 40 are performed by vapor phase synthesis such as VAD (Vapor phase Axial Deposition) or OVD (Outside Vapor phase Deposition). If portions corresponding to the inner and outer claddings 30 and 40 cannot be manufactured by vapor phase synthesis, they are manufactured by rod-in-collapse method. In this case, the size of a resultant preform is limited, so the productivity is difficult to increase.

In the method of manufacturing the optical fiber 1 of the first embodiment, the outer diameter of the outer core 20 of the optical fiber to be manufactured is set to be 25 to 40 μm, so the third step can be performed using vapor phase synthesis (the fifth step can also be performed by vapor phase synthesis). Each of the above-described steps is adjusted such that the outer diameter of the outer core 20 of the optical fiber 1 falls within the desired range.

In the method of manufacturing the optical fiber 1 of the first embodiment, the porous preform obtained in the first step is heated in an atmosphere containing a halogen gas before the second step to dehydrate the porous preform. Therefore, the inner and outer cores 10 and 20 of the resultant optical fiber contain chlorine at a predetermined concentration. The first composite preform obtained in the third step is also heated in an atmosphere containing a halogen gas before the fourth step to dehydrate the first porous glass body. Therefore, the inner cladding 30 of the resultant optical fiber also has chlorine at a predetermined concentration. A preform region corresponding to the inner cladding 30 is subjected to dehydration because even when the porous glass body (soot body) is formed on the outer surface of the outer core 20 by vapor phase synthesis (method of depositing fine glass particles using flame hydrolytic reaction), the influence of OH absorption in the resultant optical fiber can be relaxed.

The chlorine content in the inner cladding 30 is preferably lower than that in the inner and outer cores 10 and 20. Chlorine is known as a dopant for increasing the refractive index. When chlorine is doped in the core region (including the inner and outer cores 10 and 20), the contents of fluorine (index reducer) doped in the cladding region (including the inner and outer claddings 30 and 40) can be reduced without changing the refractive index profile of the optical fiber.

As described above, the contents of fluorine in the cladding region can be reduced. For this reason, instead of the sixth step of sintering the second composite preform in the atmosphere containing the fluorine raw material (including doping of fluorine), in the fifth step, the second porous glass body can be deposited by supplying a fluoride gas to the outer surface of the intermediate preform obtained in the fourth step to obtain the second composite preform. In this case, in the sixth step, only sintering of the second composite preform obtained in the fifth step is performed. For this reason, the sintering time can be shortened, and the productivity can be largely improved.

The above-described dehydration process, i.e., the heating process performed in the atmosphere containing the halogen gas may be performed for the second composite preform obtained in the fifth step before the sixth step. In this case, the outer cladding 40 of the resultant optical fiber always contains chlorine.

As the halogen gas used for dehydration, $SiCl_4$ is preferably used. According to the second embodiment according to the present invention, there is provided an optical fiber comprising a first core 160 (inner core) having a first refractive index $n_1$, a second core 170 (outer core) provided around an outer periphery of the inner core 160 and having a second refractive index $n_2$ lower than the first refractive index $n_1$, a first cladding 180 (inner cladding) provided around an outer periphery of the outer core 170 and having a third refractive index $n_3$ lower than the second refractive index $n_2$, and a second cladding 190 (outer cladding) provided around an outer periphery of the inner cladding 180 and having a fourth refractive index $n_4$ higher than the third refractive index $n_3$.

The refractive indices of the inner and outer claddings 180 and 190 of an optical fiber 150 increase in the radial direction from the inner side toward the outer side of each of the claddings 180 and 190. The inner and outer claddings 180 and 190 contain fluorine as a dopant for adjusting the refractive index.

The optical fiber of the second embodiment has a depressed cladding type profile. This refractive index profile can be realized when the following basic composition is employed: the inner core 160 is made of silica glass containing at least germanium dioxide as an index increaser ($GeO_2$—$SiO_2$); the outer core 170, silica glass essentially containing no germanium dioxide ($SiO_2$) or silica glass containing germanium dioxide ($GeO_2$—$SiO_2$); the inner cladding 180, silica glass containing at least fluorine (index reducer) (F—$SiO_2$); and the outer cladding 190, silica glass containing at least fluorine (F—$SiO_2$). When $GeO_2$ is doped in the outer core 170, the refractive index profile can hardly be flattened. For this reason, the outer core 20 preferably contains no germanium dioxide. In addition, the outer diameter of the outer core 170 is preferably 25 to 40 μm to effectively prevent the influence of nonlinear optical effects, as in the above-described first embodiment.

According to the second embodiment according to the present invention, there is provided a method of manufacturing the optical fiber 150, comprising at least the first step (FIGS. 2 to 7) of forming, by vapor phase synthesis such as VAD (Vapor phase Axial Deposition) or OVD (Outside Vapor phase Deposition), a porous preform 50 whose central portion along a longitudinal direction corresponds to the inner core 160 and whose peripheral portion around the central portion corresponds to the outer core 170, and sintering the porous preform 50 to obtain a core glass preform 51, the second step of elongating the core glass preform 51 to a desired outer diameter (FIG. 8), heating, in an atmosphere containing a fluorine raw material having a predetermined concentration at a predetermined temperature, a first composite preform 52 (FIG. 9) obtained by depositing a first porous glass body corresponding to the inner cladding 180 on an outer surface of the elongated core glass preform 51 by vapor phase synthesis, and vitrifying the first composite preform 52 after the atmosphere temperature is increased and the concentration of the fluorine raw material contained in the atmosphere is changed, thereby obtaining a transparent intermediate preform 53 (FIG. 12), and the third step (FIG. 11) of elongating the intermediate preform 53 to a predetermined outer diameter (FIG. 8), heating, in an atmosphere containing a fluorine raw material having a predetermined concentration at a predetermined temperature, a second composite preform 54 (FIG. 9) obtained by depositing a second porous glass body corresponding to the outer cladding 190 on an outer surface of the elongated intermediate preform 53 by vapor phase synthesis, and making the second composite preform 54 transparent after the atmosphere temperature is increased and the concentration of the fluorine raw material contained in the atmosphere is changed (FIG. 12), thereby obtaining a transparent optical fiber preform 55.

In the second and third steps in the method of manufacturing the optical fiber 150 of the second embodiment, the supply amount of the fluorine raw material doped in the preform regions corresponding to the inner and outer claddings 180 and 190 as an index adjustment material is adjusted (the fluorine concentration in the atmosphere in the above-described heating and vitrifying processes is adjusted). More specifically, when fluorine as an index adjustment material is doped in the glass material, flaws and the like are readily formed on the glass surface. To prevent this, in the second step, the concentration of the fluorine raw material contained in the atmosphere when heating the first composite preform 52 is set to be higher than that in the atmosphere when making the first composite preform 52 transparent, and in the third step as well, the concentration of the fluorine raw material contained in the atmosphere when heating the second composite preform 54 is set to be higher than that in the atmosphere when making the second composite preform 54 transparent.

When the fluorine concentration in the preform reason corresponding to the inner cladding 100 is lowered in the radial direction from the inner region to the peripheral region (the refractive index of the preform region is increased in the radial direction), the index difference from the inner region of the preform region, which corresponds to the outer cladding 190, is made small. In other words, when the concentration of fluorine to be doped in a predetermined preform region is adjusted such that the fluorine concentration is lowered at the interface between the inner cladding 180 and the outer cladding 190 of the resultant optical fiber, bubble occurrence in the preform or deformation of the preform itself can be effectively prevented during sintering of the preform. When contents of fluorine in the preform region corresponding to the outer cladding 190 is also adjusted in the radial direction, deformation in the heating process or flaws on the outer surface of the preform or outer surface of the resultant optical fiber in handling during the manufacture can be effectively prevented.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2 is a view for explaining a step in the manufacture of an optical fiber using VAD and, more particularly, a process of manufacturing a porous preform;

FIG. 3 is a view for explaining another step in the manufacture of the optical fiber using VAD and, more particularly, a process of dehydrating the porous preform obtained by VAD shown in FIG. 2;

FIG. 4 is a view for explaining still another step in the manufacture of the optical fiber using VAD and, more particularly, a process of sintering the porous preform;

FIG. 5 is a view for explaining a step in the manufacture of an optical fiber using OVD and, more particularly, a process of manufacturing a porous preform;

FIG. 6 is a view for explaining another step in the manufacture of the optical fiber using OVD and, more particularly, a process of dehydrating the porous preform obtained by OVD shown in FIG. 5;

FIG. 7 is a view for explaining still another step in the manufacture of the optical fiber using OVD and, more particularly, a process of sintering the porous preform;

DETAILED DESCRIPTION OF THE PREFERRED EMBODIMENTS

Figure 1:
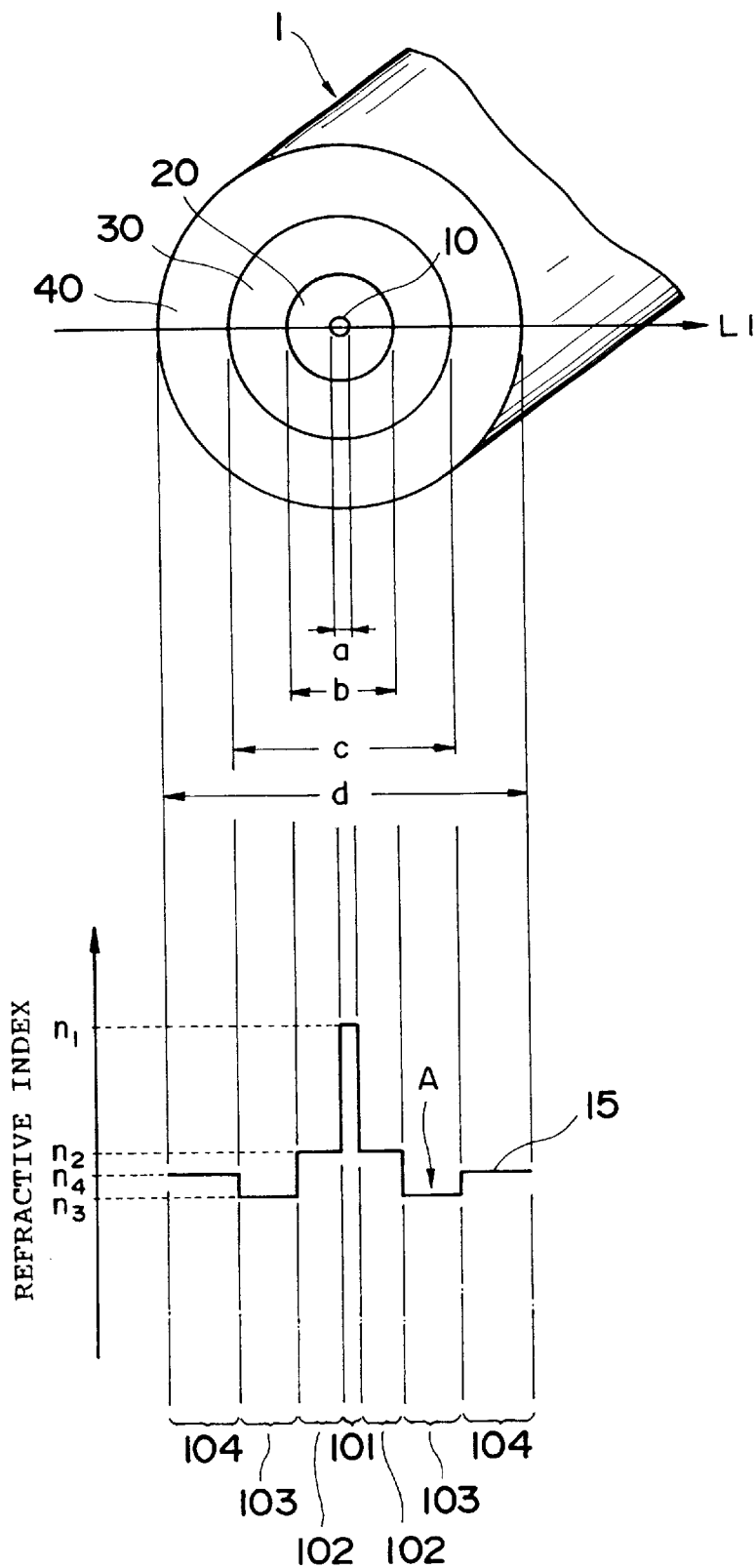
FIG. 1 is a view showing the sectional structure and refractive index profile of an optical fiber of the first embodiment according to the present invention.

An optical fiber according to the present invention and a method of manufacturing the same will be described below with reference to FIGS. 1 to 15. The same reference numerals denote the same parts throughout the drawings, and a detailed description thereof will be omitted.

FIG. 1 is a view showing the sectional structure and refractive index profile of an optical fiber (dispersion-shifted fiber having a depressed cladding type profile) of the first embodiment according to the present invention. Particularly, an optical fiber 1 of the first embodiment is a dispersion-shifted fiber whose mode field diameter (MFD) is 8.6 $\mu$m or more (preferably, 9 $\mu$m or more) and whose zero-dispersion wavelength is shifted to the long or short wavelength side of 1.55 Mm. The optical fiber 1 is a single-mode optical fiber mainly containing silica glass.

In FIG. 1, the optical fiber 1 has an inner core 10 having a first refractive index $n_1$ and an outer diameter a, and an outer core 20 disposed around the inner core 10 and having a second refractive index $n_2$ lower than the first refractive index ni. The outer diameter of the outer core 20 is set within the range of 25 to 40 $\mu$m, so the outer core 20 has a large sectional area.

The optical fiber 1 also has, as a cladding region around the core region (including the inner and outer cores 10 and 20), an inner cladding 30 disposed around the outer core 20 and having a third refractive index $n_3$ lower than the second refractive index $n_2$ and an outer diameter c, and an outer cladding 40, i.e., a glass region disposed around the inner cladding 30 and having a fourth refractive index $n_4$ higher than the third refractive index $n_3$ and lower than the second refractive index $n_2$ and an outer diameter d, thereby realizing a depressed cladding type profile having a depressed part A at a portion corresponding to the cladding region (FIG. 1).

The abscissa of a refractive index profile 15 shown in FIG. 1 corresponds to a line L1 on a section (section perpendicular to the propagation direction of signal light) of the optical fiber 1 (depressed optical fiber). In this refractive index profile 15, a region 101 corresponds to the refractive index ($n_1$) of the inner core 10 on the line L1; a region 102, the refractive index ($n_2$) of the outer core 20 on the line L1; a region 103, the refractive index ($n_3$) of the inner cladding 30 on the line L1; and a region 104, the refractive index ($n_4$) of the outer cladding 40 on the line L1.

The basic composition of the optical fiber 1 according to the first embodiment is as follows. The inner core 10 is made of $GeO_2$—$SiO_2$; the outer core 20, $SiO_2$ or $GeO_2$—$SiO_2$; the inner cladding 30, F—$SiO_2$; and the outer cladding 40, F—$SiO_2$.

In the optical fiber 1 of the first embodiment, since at least the inner core 10 and the outer core 20 contain chlorine as will be described later, actual compositions and relative refractive index differences $\Delta$ of glass region with respect to pure silica glass are as follows.

Inner core:
$SiO_2$+$GeO_2$+Cl
$\Delta=(\alpha+0.8)\%$ to $(\alpha+0.9)\%$

Outer core:
$SiO_2$+($GeO_2$)+Cl
$\Delta=\alpha\%$

Inner cladding:
$SiO_2$+F+(Cl)
$\Delta=(\alpha-0.3)\%$ to $(\alpha 0.1)\%$

Outer cladding:
$SiO_2$+F+(Cl)
$\Delta=(\alpha-0.15)\%$ to $(\alpha-0.05)\%$ where $\alpha$ represents the contribution of chlorine (Cl) to a change in refractive index, and $\alpha$ is 0.1% to 0.2% (Cl is known as a dopant for increasing the refractive index, and the change in refractive index due to Cl is 0.01% for a Cl concentration of 1,000 ppm). In this specification, the relative refractive index difference $\Delta$ of each glass region with respect to pure silica glass is as follows.

$$\Delta=(n_t^2-n_0^2)/2n_0^2\approx(n_t-n_0)/n_0$$

where $n_0$ is the refractive index of pure silica glass as a reference, and $n_t$ is the refractive index of each glass region.

A method of manufacturing the optical fiber 1 of the first embodiment will be described next with reference to FIGS. 2 to 12.

In this manufacturing method, in the first step, a porous preform 50 as a prospective core region including the inner core 10 and the outer core 20 is formed by vapor phase synthesis such as VAD (Vapor phase Axial Deposition) or OVD (Outside Vapor phase Deposition), and in the second step, the porous preform 50 is sintered to obtain a core glass preform 51.

FIGS. 2 to 4 are views for explaining the first and second steps of VAD. FIGS. 5 to 7 are views for explaining the first and second steps of OVD.

The first and second steps of VAD will be described first with reference to FIGS. 2 to 4.

In the first step, the porous preform 50 is manufactured using a soot applying apparatus shown in FIG. 2. This soot applying apparatus comprises at least a vessel 500 having an exhaust port 504, and a support mechanism 503 for supporting the porous preform 50. The support mechanism 503 has a rotatable support rod 502. A starting rod 501 for growing the porous preform 50 is attached to the distal end of the support rod 502.

The soot applying apparatus shown in FIG. 2 also has a burner 552 for depositing a porous glass body (soot body) corresponding to the inner core 10, and a burner 551 for depositing a porous glass body (soot body) corresponding to the outer core 20. A gas supply system 600 supplies a desired source gas (e.g., $GeCl_4$ or $SiCl_4$), a combustion gas ($H_2$ and $O_2$), and a carrier gas such as Ar or He to the burners 551 and 552.

During the manufacture of the porous preform 50, fine glass particles are generated in the flames from the burners 551 and 552 by hydrolytic reaction of the source gas supplied from the gas supply system 600 and deposited on the distal end portion of the starting rod 501. During this process, the support mechanism 503 pulls up the support rod 502 at the distal end in a direction indicated by an arrow S2 (longitudinal direction of the porous preform 50) while rotating it in a direction indicated by an arrow S1. With this operation, a porous glass body is grown downward from the starting rod 501, so the porous preform 50 (soot preform) whose central portion along the longitudinal direction corresponds to the inner core 10 and whose peripheral portion around the central portion corresponds to the outer core 20 is obtained.

The porous preform 50 obtained in the first step is loaded in a heating vessel 700 shown in FIG. 3 and subjected to dehydration in an atmosphere containing a halogen gas. The heating vessel 700 has an introduction port 702 for supplying the halogen gas and an exhaust port 701. During dehydration, the support mechanism 503 moves the porous preform 50 in a direction indicated by an arrow S4 while rotating it in a direction indicated by an arrow S3 (with this operation, the entire porous preform 50 is heated).

The temperature in the vessel during dehydration is 1,000° C. to 1,300° C., and preferably, 1,050° C. to 1,150° C. In this embodiment, dehydration is performed while supplying chlorine gas ($Cl_2$) having a concentration of 20,000 ppm (2%) from the introduction port 702. When the concentration of the chlorine gas is 10,000 to 50,000 ppm (1% to 5%), a sufficient effect can be obtained.

Even when not the chlorine gas but a halogen gas such as $SiCl_4$ is used as a dehydration gas, the same effect as described above can be obtained. Specifically, $SiCl_4$ can be used to increase the content of chlorine and increase the refractive index difference between the outer core 20 and the inner cladding 30.

In the first step, the source gas to be supplied to the burners 551 and 552 is adjusted such that the ratio (b/a) of an outer diameter b of the outer core 20 to the outer diameter a of the inner core 10 of the resultant optical fiber is 7.5 to 15.

The porous preform 50 obtained by the above process is sintered in the heating vessel 700 (second step of VAD). FIG. 4 shows only the main portion of the heating vessel shown in FIG. 3. As shown in FIG. 4, the support mechanism 503 moves the porous preform 50 in a direction indicated by an arrow S6 while rotating it in a direction indicated by an arrow S5. With this operation, the porous preform 50 is inserted into a heater 750 from its distal end (the temperature in the vessel in sintering is 1,500° C. to 1,650° C.), thus obtaining the transparent core glass preform 51.

The manufacture, dehydration, and sintering of the porous preform 50 may be performed in one vessel.

The first and second steps of OVD will be described next with reference to FIGS. 5 to 7.

In the first step, the porous preform 50 is manufactured using a soot applying apparatus shown in FIG. 5. A vessel 800 of this soot applying apparatus has a center rod 801 with its one end held by the support mechanism 503 through the support rod 502 and the other end held by an auxiliary mechanism 505. The vessel 800 of the soot applying apparatus also has an exhaust port 802 and a burner 850 for growing the porous preform 50 along the center rod 801.

During the manufacture of the porous preform 50, fine glass particles are generated in the flame from the burner 850 by hydrolytic reaction of the source gas supplied from the gas supply system 600 and deposited on the outer surface of the center rod 801. During this process, the support mechanism 503 and the auxiliary mechanism 505 move the center rod 801 in a direction indicated by arrows S8 and S9 while rotating it in a direction indicated by an arrow S7 (the support mechanism 503 and the auxiliary mechanism 505 move at the same speed). With this operation, a porous glass body is grown along the center rod 801. This process is repeated twice to form a porous glass body corresponding to the inner core 10 and a porous glass body corresponding to the outer core 20, so the porous preform 50 (soot preform) whose central portion along the longitudinal direction will become the inner core 10 and whose peripheral portion around the central portion will become the outer core 20 is obtained.

After the center rod 801 is removed from the porous preform 50 obtained in the first step, and instead, an auxiliary rod 703 is attached to the porous preform 50, the porous preform 50 is loaded into the heating vessel 700 shown in FIG. 6 and subjected to dehydration in an atmosphere containing a halogen gas. The heating vessel 700 has the introduction port 702 for supplying the halogen gas and the exhaust port 701. During dehydration, the support mechanism 503 moves the porous preform 50 in a direction indicated by an arrow S11 while rotating it in a direction indicated by an arrow S10. With this operation, the entire porous preform 50 is heated. Note that conditions such as the temperature in the vessel in dehydration and the concentration of chlorine gas to be supplied may be the same as those in the above-described VAD (FIGS. 2 to 4).

The resultant porous preform 50 obtained by the above process is sintered in the heating vessel 700 (second step of OVD). FIG. 7 shows only the main portion of the heating vessel shown in FIG. 6. As shown in FIG. 6, the support mechanism 503 moves the porous preform 50 in a direction indicated by an arrow S13 while rotating it in a direction indicated by an arrow S12. With this operation, the porous preform 50 is inserted into the heater 750 from its distal end, thus obtaining the transparent core glass preform 51.

The manufacture, dehydration, and sintering of the porous preform 50 may be performed in one vessel. The core glass preform obtained by OVD is different from that obtained by VAD only in that the core glass preform obtained by OVD has a through hole 550 formed upon removing the center rod 801.

Processes after the third step (particularly, processes associated with vapor phase synthesis) will be described in detail on the basis of VAD. OVD may be used instead of VAD.

Figure 8:
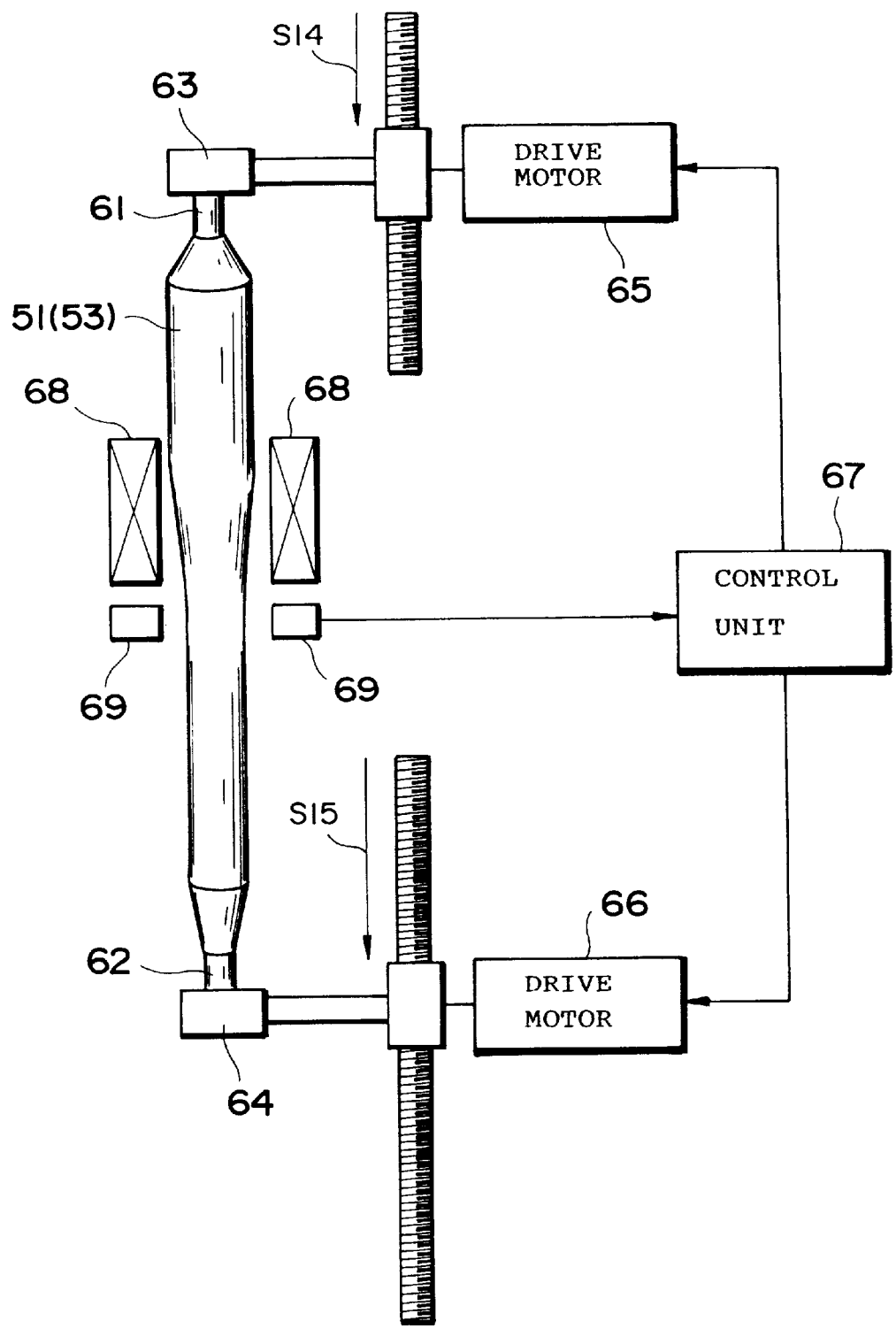
FIG. 8 is a view for explaining a process of elongating the preform in the manufacture of the optical fiber according to the present invention.

In the third step, the transparent core glass preform 51 obtained in the second step is elongated to a desired outer diameter (finish outer diameter) using an elongation apparatus shown in FIG. 8. Before elongating, the two end portions of the core glass preform 51 are subjected to an end process, and rods 61 and 62 are attached to the core glass preform 51 to facilitate handling.

The elongation apparatus shown in FIG. 8 has an upper chuck 63 movable in a direction indicated by an arrow S14, and a lower chuck 64 movable in a direction indicated by an arrow S15. The upper and lower chucks 63 and 64 are moved by drive motors 65 and 66 in the directions indicated by the arrows S14 and S15, respectively. The rod 61 is held by the upper chuck 63, and the rod 62 is held by the lower chuck 64, so the core glass preform 51 which has undergone the end process is attached to the elongation apparatus shown in FIG. 8.

The upper chuck 63 moves in the direction indicated by the arrow S14 to insert the core glass preform 51 into a heater 68 (e.g., a vertical resistance heating furnace). On the other hand, the lower chuck 64 moves in the direction indicated by the arrow S15 to extract the core glass preform 51 from the heater 68. The core glass preform 51 inserted into the heater 68 is partially softened. Therefore, in this elongation apparatus, the moving speed of the lower chuck 64 (speed for extracting the core glass preform 51 from the heater 68) is increased as compared with that of the upper chuck 63 (speed for inserting the core glass preform 51 into the heater 68) to apply a tensile stress to the softened portion of the core glass preform 51, thereby elongating the core glass preform 51 to a desired outer diameter.

A control unit 67 always monitors the outer diameter at a predetermined position of the heated softened portion using an outer diameter measurement device 69 and controls the drive motors 65 and 66 so as to obtain the desired finish outer diameter.

Figure 9:
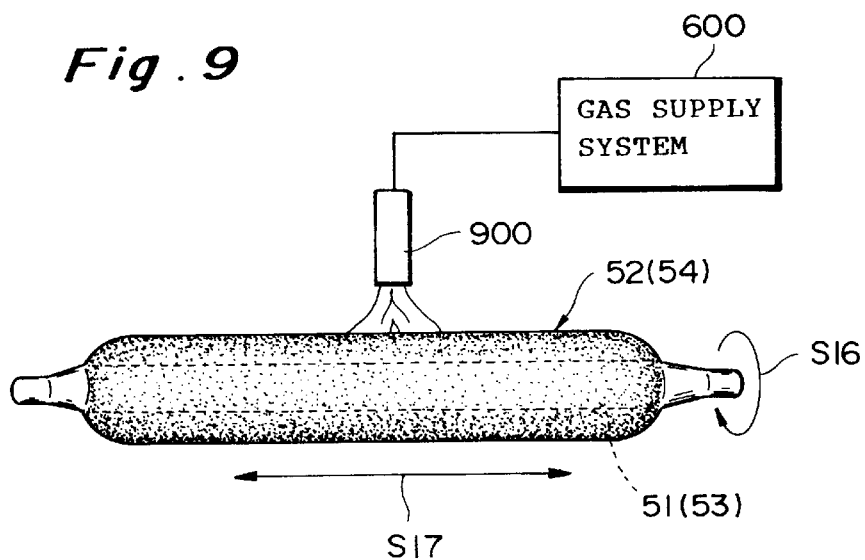
FIG. 9 is a view for explaining a process of manufacturing a composite preform in the manufacture of the optical fiber according to the present invention.

In the third step, next, the first porous glass body as the inner cladding 30 is deposited on the outer surface of the core glass preform 51 elongated by the elongation apparatus, thereby obtaining a first composite preform 52. More specifically, fine glass particles are generated in the flame from a burner 900 by hydrolytic reaction of the source gas supplied from the gas supply system 600 and deposited on the outer surface of the elongated core glass preform 51, as shown in FIG. 9. During this process, the elongated core glass preform 51 moves in a direction indicated by an arrow S17 while rotating in a direction indicated by an arrow S16. With this operation, a porous glass body (soot body) is deposited on the outer surface of the core glass preform 51, thus obtaining the first composite preform 52.

In the third step, the source gas to be supplied to the burner 900 is adjusted such that the ratio (c/b) of the outer diameter c of the inner cladding 30 to the outer diameter b of the outer core 20 of the resultant optical fiber is 1.5 to 2.5 (preferably, 1.8 to 2.2).

Figure 10:
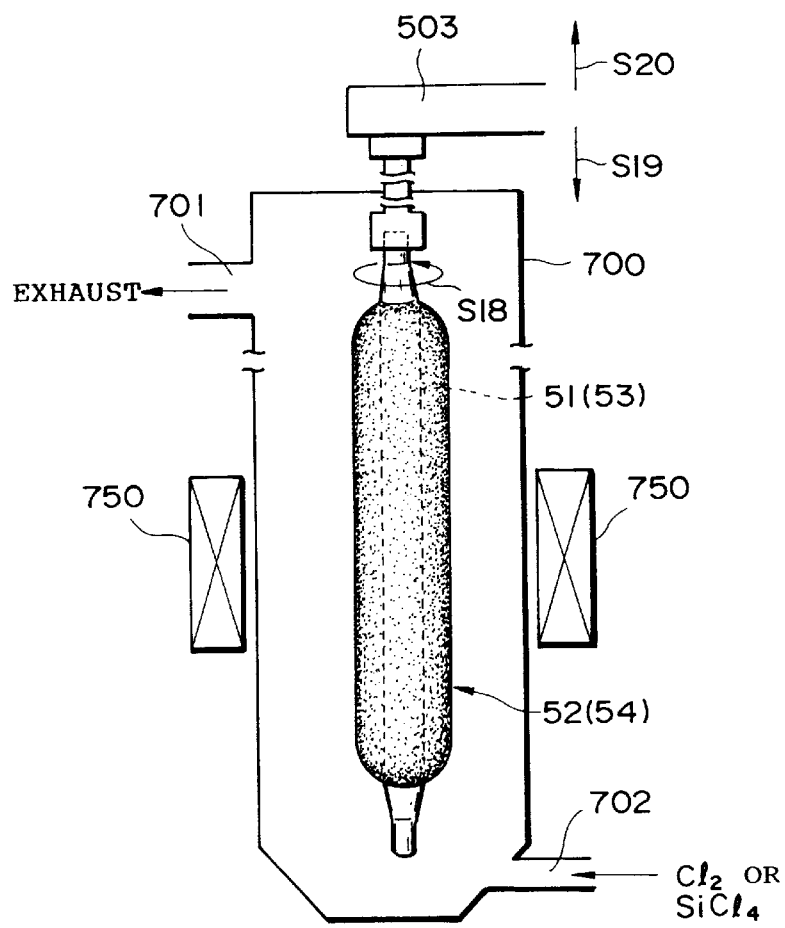
FIG. 10 is a view for explaining a dehydration process in the manufacture of the optical fiber according to the present invention.

The first composite preform 52 obtained by the third step is temporarily heated in an atmosphere containing a halogen gas to perform hydration before the fourth step (FIG. 10). During this process, the support mechanism 503 moves the first composite preform 52 in directions indicated by arrows S19 and S20 while rotating it in a direction indicated by an arrow S18.

With this operation, the entire first composite preform 52 is heated. As a hydration gas, $Cl_2$ is used ($SiCl_4$ may also be used). The concentration of the chlorine gas supplied into the heating vessel 700 is 10,000 to 50,000 ppm (1% to 5%, and in this embodiment, 20,000 ppm (2%)), as described above. The heating temperature in the vessel is 1,000° C. to 1,300° C., and preferably, 1,050° C. to 1,150° C.

Figure 11:
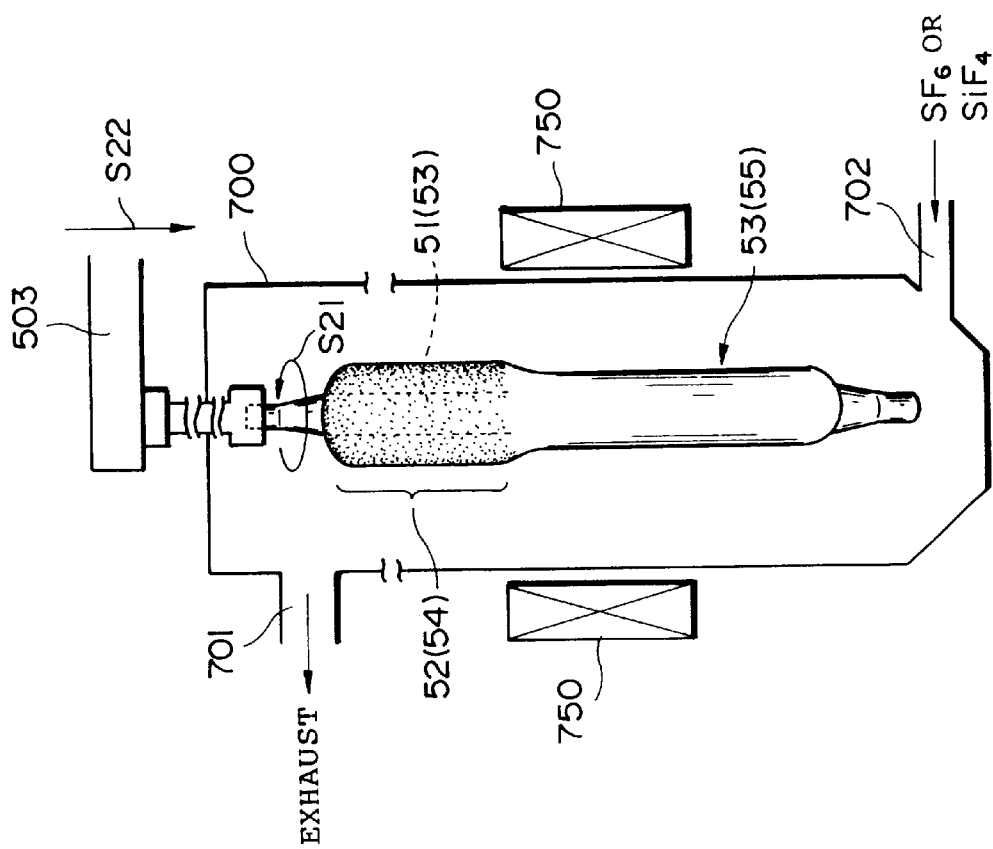
FIG. 11 is a view for explaining a process of sintering the preform in the manufacture of the optical fiber according to the present invention.

In the fourth step, the first composite preform 52 which has undergone dehydration is sintered in an atmosphere containing a fluorine raw material, as shown in FIG. 11, to obtain a transparent intermediate preform 53. Sintering is continuously performed in the above-described heating vessel 700. The support mechanism 503 moves the first composite preform 52 in a direction indicated by an arrow S22 while rotating it in a direction indicated by an arrow S21. With this operation, the first composite preform 52 is inserted into the heater 750.

More specifically, as the fluoride gas to be supplied into the heating vessel 700, $SF_6$ or $SiF_4$ can be used. In this embodiment, $SiF_4$ having a concentration of 20,000 ppm (2%) is supplied. The temperature in the vessel is 1,000° C. to 1,200° C. (preferably, 1,050° C. to 1,150° C.). The first composite preform 52 is heated in this fluoride gas atmosphere, thereby impregnating the first porous glass body (soot body formed on the outer surface of the core glass preform 51) with fluorine. Thereafter, the temperature in the vessel is increased to 1,400° C. to 1,600° C. (preferably, 1,450° C. to 1,550° C.) to sinter the first composite preform 52, thereby obtaining the intermediate preform 53.

The contents of fluorine is adjusted by adjusting the concentration of the fluoride gas to be supplied. Alternatively, when the concentration of the fluoride gas is appropriately adjusted during the process of impregnating the first porous glass body with fluorine and the sintering process, the contents of fluorine can be adjusted to a desired value.

In the subsequent fifth step, the second porous glass body as the outer cladding 40 is formed on the outer surface of the intermediate preform 53 obtained by the fourth step to obtain a second composite preform 54.

In the fifth step, the intermediate preform 53 obtained in the fourth step is elongated to a desired finish outer diameter using the elongation apparatus shown in FIG. 8, as in the above-described third step. Thereafter, the second porous glass body is formed on the outer surface of the elongated intermediate preform 53 (fine glass particles are generated in the flame from the burner 900 by hydrolytic reaction of the source gas supplied from the gas supply system 600 and deposited on the outer surface of the elongated intermediate preform 53), as shown in FIG. 9, thereby obtaining the second composite preform 54.

In the fifth step, the source gas to be supplied to the burner 900 is adjusted such that the ratio (d/c) of the outer diameter of the outer cladding 40 to that of the inner cladding 30 of the resultant optical fiber has a desired value when the outer diameter of the resultant optical fiber is 125 $\mu$m (after drawing in the seventh step).

In the subsequent sixth step, the second composite preform 54 obtained by the fifth step is sintered in an atmosphere containing a fluorine raw material, as in the above-described fourth step, thereby finally obtaining an optical fiber preform 55 (FIG. 11).

The second composite preform 54 obtained by the fifth step need not always be subjected to dehydration shown in FIG. 10, and the dehydration process may be appropriately omitted.

In the first embodiment, since dehydration is performed for the first composite preform 52 using chlorine gas, the inner core 10, the outer core 20, and the inner cladding 30 of the resultant optical fiber 1 always contain chlorine. In this case, the chlorine content in the inner cladding 30 is preferably lower than that in the inner and outer cores 10 and 20. Chlorine is known as a dopant for increasing the refractive index. When chlorine is doped into the core region (including the inner and outer cores 10 and 20), the contents of fluorine to be doped into the cladding region (including the inner and outer claddings 30 and 40) can be reduced without changing the refractive index profile of the optical fiber.

As described above, the fluorine contents in the cladding region can be reduced. For this reason, when a fluoride gas is supplied around the intermediate preform obtained by the fourth step instead of sintering the second composite preform in the atmosphere containing a fluorine raw material in the sixth step (fluorine doping process shown in FIG. 11), the second porous glass body containing fluorine at a predetermined concentration can be deposited to obtain the second composite preform.

In the above-described process of doping fluorine during deposition of the glass body, the contents of fluorine is limited due to the following reason. The fluorine concentration at the fine glass particle deposition portion (part of the second porous glass body) formed for the first time is higher than that at the fine glass particle deposition portion formed by the final step of fine glass particle deposition. For this reason, the refractive index distribution in the radial direction along the longitudinal direction of the optical fiber 1 obtained from the first composite preform 52 cannot be made uniform. This phenomenon becomes conspicuous as the contents of fluorine to be doped increases. This means that the alternative process is not suitable for fluorine doping when the index difference between the glass region containing fluorine and pure silica glass exceeds 0.2%.

When the contents of fluorine in the cladding region can be reduced, as in the present invention, fluorine can be doped in the second porous glass body corresponding to the outer cladding 40 simultaneously with not sintering but formation of the second porous glass body. In this case, only sintering of the second composite preform obtained by the fifth step is performed in the sixth step. Since the sintering time can be shortened, the productivity can be largely improved.

Figure 12:
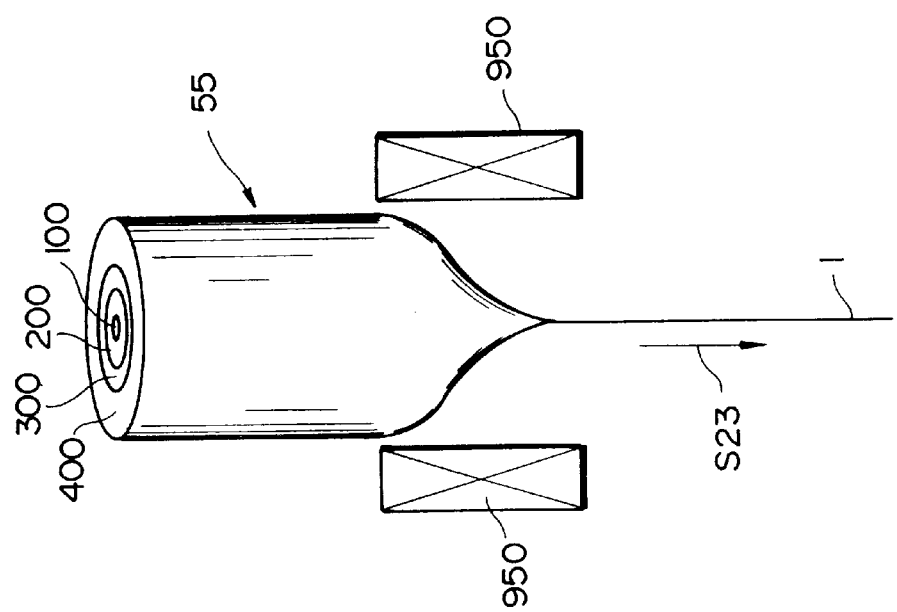
FIG. 12 is a view for explaining a fiber-drawing process in the manufacture of the optical fiber according to the present invention.

The optical fiber preform 55 manufactured by the above processes comprises an inner core glass 100 corresponding to the inner core 10 of the optical fiber 1, an outer core glass 200 corresponding to the outer core 20, an inner cladding glass 300 corresponding to the inner cladding 30, and an outer cladding glass 400 corresponding to the outer cladding 40, as shown in FIG. 12.

In the seventh step, the optical fiber preform 55 having the above structure is drawn while heating one end of the optical fiber preform 55 using a heater 950, thereby obtaining the optical fiber 1 having a diameter of 125 μm shown in FIG. 1.

In the above-described manufacturing method, each step is adjusted such that the outer diameter b of the outer core 20 of the resultant optical fiber 1 becomes 25 μm or more (preferably, 28 μm or more) after drawing in the seventh step. The outer diameter b of the outer core 20 is set to have a value for preventing the glass synthesis interface (e.g., the outer surface of the core glass preform 51) from approaching a region where the influence of an increase in power of propagating signal light is not generated. When the porous glass body is to be synthesized with the outer surface of the core glass preform 51 (glass rod), the outer surface of the preform is heated by a flame for forming (glass-synthesizing) the glass body, so OH groups readily enter the surface layer of the core glass preform 51. It is therefore important to relax the influence of OH absorption in the resultant optical fiber 1. The present inventors confirmed as a result of experiments that the peaks of OH absorption in optical fibers having the outer cores 20 with outer diameters of 25 μm, 30 μm, and 33 μm were 0.3 dB/km, 0.8 dB/km, and 1.3 dB/km, respectively. The upper limit value of the outer diameter b of the outer core 20 depends on a design for setting the zero-dispersion wavelength in the 1.55-μm wavelength band. The present inventors confirmed that desired fiber characteristics were obtained when the outer diameter b was 40 μm or less, and in many cases, 25 to 35 μm.

The second embodiment according to the present invention will be described next. The same parts as in the first embodiments will be described with reference to the same drawings.

Figure 13:
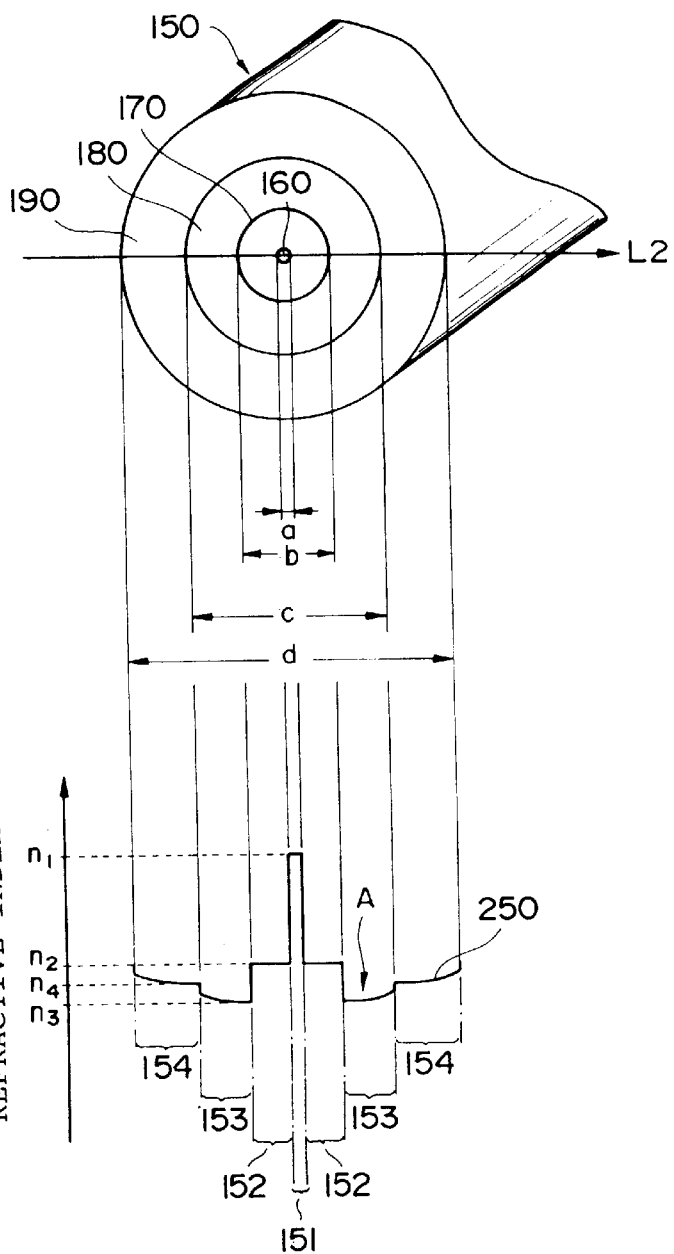
FIG. 13 is a view for explaining the sectional structure of an optical fiber of the second embodiment according to the present invention and a method of manufacturing the same.

FIG. 13 is a view showing the sectional structure and refractive index profile of an optical fiber (dispersion-shifted fiber having a depressed cladding type profile) of the second embodiment according to the present invention. Particularly, an optical fiber 150 of the second embodiment is a dispersion-shifted fiber whose mode field diameter (MFD) is 8.6 μm or more (preferably, 9 μm or more) and whose zero-dispersion wavelength is shifted to the long or short wavelength side of 1.55 μm. The optical fiber 1 is a single-mode optical fiber mainly containing silica glass.

In FIG. 13, the optical fiber 150 has an inner core 160 having a first refractive index $n_1$ and an outer diameter a, and an outer core 170 disposed around the inner core 160 and having a second refractive index $n_2$ lower than the first refractive index $n_1$ and an outer diameter b.

The optical fiber 150 also has, as a cladding region around the core region (including the inner and outer cores 160 and 170), an inner cladding 180 disposed around the outer core 170 and having a third refractive index $n_3$ lower than the second refractive index $n_2$ and an outer diameter c, and an outer cladding 190, i.e., a glass region disposed around the inner cladding 180 and having a fourth refractive index $n_4$ higher than the third refractive index $n_3$ and lower than the second refractive index $n_2$ and an outer diameter d, thereby realizing a depressed cladding type profile having a depressed part A at a portion corresponding to the cladding region (FIG. 13).

Figure 14:
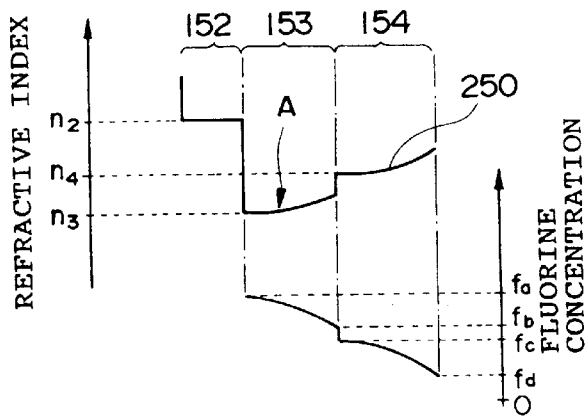
FIG. 14 is a graph showing the relationship between the refractive index and a fluorine content in a cladding region of the optical fiber shown in FIG. 13 along the radial direction of the optical fiber.

In particular, the refractive indices of the inner and outer claddings 180 and 190 respectively increase in the radial direction from the inner region to the outer region of each of the claddings 180 and 190, as shown in FIG. 14. In other words, the concentration of fluorine (dopant for reducing the refractive index) contained in the first and second claddings 180 and 190 decreases in the radial direction from the inner region to the outer region of each of the cladding 180 and 190.

In FIG. 14, fa is the fluorine concentration in the inner region of the inner cladding 180; fb (<fa), the fluorine concentration in the peripheral region of the inner cladding 180; fc, the fluorine concentration in the inner region of the outer cladding 190; and fd (<fc), the fluorine concentration in the peripheral region of the outer cladding 190.

The abscissa of a refractive index profile 250 shown in FIG. 13 corresponds to a line L2 on a section (section perpendicular to the propagation direction of signal light) of the optical fiber 150 (depressed type optical fiber). In this refractive index profile 250, a region 151 corresponds to the refractive index ($n_1$) of the inner core 160 on the line L2; a region 152, the refractive index ($n_2$) of the outer core 170 on the line L2; a region 153, the refractive index ($n_3$) of the inner cladding 180 on the line L2; and a region 154, the refractive index ($n_4$) of the outer cladding 190 on the line L2.

The basic composition of the optical fiber 150 according to the second embodiment is as follows. As in the first embodiment, the inner core 160 is made of $GeO_2$—$SiO_2$; the outer core 170, $SiO_2$ or $GeO_2$—$SiO_2$; the inner cladding 180, F—$SiO_2$; and the outer cladding 190, F—$SiO_2$.

In the optical fiber 150 of the second embodiment, since at least the inner core 160 and the outer core 170 contain chlorine, as in the first embodiment, actual compositions and relative refractive index differences Δ of glass regions with respect to pure silica glass are as follows.

Inner core:
$SiO_2$+$GeO_2$+Cl
Δ=(α+0.8)% to (α+0.9)%

Outer core:
  $SiO_2$+($GeO_2$)+Cl
  Δ=α%
Inner cladding: $SiO_2$+F+(Cl)
  (Inner region) Δ=(Δ−0.3)% to (α−0.1)%
Outer cladding: $SiO_2$+F+(Cl)
  (Outer region) Δ=(α−0.15)% to (α−0.05)%

In the optical fiber 150 shown in FIG. 13, the refractive indices of the inner and outer claddings 180 and 190 are designed to become higher in the radial direction from the inner region to the outer region (the refractive index difference between the outer core 170 and the peripheral region is smaller than that between the outer core 170 and the inner region). The definition of each parameter is the same as in the first embodiment.

A method of manufacturing the optical fiber 150 according to the second embodiment will be described next. Some steps in the manufacture of the second embodiment are the same as in the first embodiment, and the manufacturing method of the second embodiment will also be described with reference to FIGS. 2 to 12.

In this manufacturing method, in the first step, a porous preform 50 as a prospective core region including the inner core 160 and the outer core 170 is formed by vapor phase synthesis such as VAD (Vapor phase Axial Deposition) (FIGS. 2 to 4) or OVD (Outside Vapor phase Deposition) (FIGS. 5 to 7), and the porous preform 50 is sintered to obtain a core glass preform 51.

The first step is the same as the first and second steps of the first embodiment.

More specifically, in VAD, the porous preform 50 is manufactured and subjected to dehydration and sintering, thereby obtaining the transparent core glass preform 51, as shown in FIGS. 2 to 4.

In OVD, the porous preform 50 is manufactured and subjected to dehydration and sintering, thereby obtaining the transparent core glass preform, as shown in FIGS. 5 to 7.

In the second embodiment, the core glass preform obtained by OVD is different from that obtained by VAD only in that the core glass preform obtained by OVD has a through hole 550 formed upon removing a center rod 801, as in the first embodiment.

In the second embodiment as well, processes after the second step (particularly, processes associated with vapor phase synthesis) will be described in detail on the basis of VAD. OVD may be used instead of VAD. In the second step, a preform region corresponding to the inner cladding 180 is manufactured.

In the second step, the transparent core glass preform 51 obtained in the first step (FIGS. 2 to 4 or FIGS. 5 to 7) is elongated to a desired outer diameter (finish outer diameter) using an elongation apparatus shown in FIG. 8.

In the second step, next, the first porous glass body as the inner cladding 180 is deposited on the outer surface of the core glass preform 51 elongated by the elongation apparatus, thereby obtaining a first composite preform 52, as shown in FIG. 9.

The first composite preform 52 obtained by the above process is temporarily heated in an atmosphere containing a halogen gas to perform hydration (FIG. 10). Specifically, when the porous glass body is to be synthesized with the outer surface of the core glass preform 51 (glass rod), the outer surface of the preform is heated by a flame for forming (glass-synthesizing) the glass body, so OH groups readily enter the surface layer of the core glass preform 51. It is therefore important to perform dehydration to relax the influence of OH absorption in the resultant optical fiber 150. Conditions for dehydration are the same as in the first embodiment.

In this step, the first composite preform 52 which has undergone dehydration is made transparent (sintered) in an atmosphere containing a fluorine raw material, as shown in FIG. 11, to obtain a transparent intermediate preform 53. This process of making the preform transparent is continuously performed in a heating vessel 700. A support mechanism 503 moves the first composite preform 52 in a direction indicated by an arrow S22 while rotating it in a direction indicated by an arrow S21. With this operation, the first composite preform 52 is inserted into a heater 750. Conditions are the same as in the first embodiment.

Figure 15:
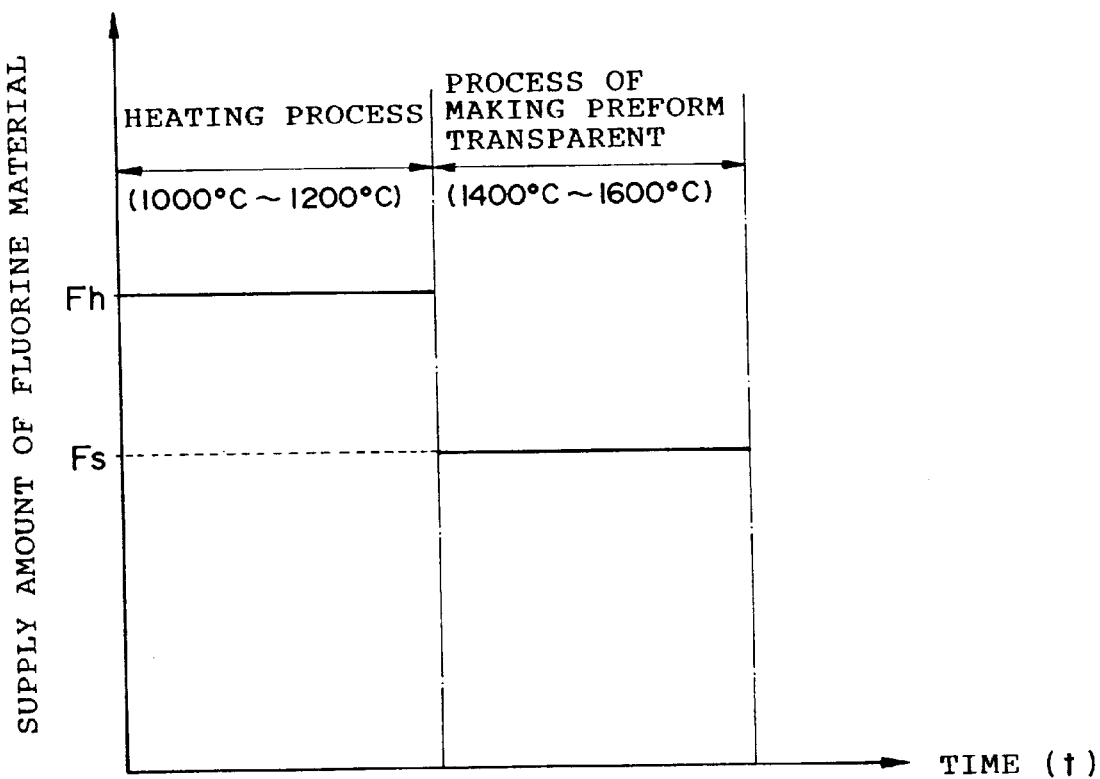
FIG. 15 is a graph showing a change in supply amount of the fluorine raw material in the preform sintering process shown in FIG. 11 along the time axis.

The contents of fluorine is adjusted by changing the supply amount of the fluorine raw material between the heating process and the process of making the preform transparent, as shown in FIG. 15. In FIG. 15, Fh represents the fluorine raw material supply amount during the heating process; and Fs (<Fh), the fluorine raw material supply amount during the process of making the preform transparent. Since fluorine contained in the first composite preform 52 in the heating process is gradually diffused from the preform surface into the atmosphere during the process of making the preform transparent, the fluorine concentration in the preform glass region corresponding to the inner cladding 180 lowers in the radial direction from the inner region to the peripheral region (the refractive index of the glass region increases in the radial direction).

In the subsequent third step, the second porous glass body as the outer cladding 190 is formed on the outer surface of the intermediate preform 53 obtained by the second step (manufacture of a second composite preform 54), and the second composite preform 54 is sintered to obtain an optical fiber preform 55.

In the third step, the obtained intermediate preform 53 is elongated to a desired finish outer diameter using the elongation apparatus shown in FIG. 8, as in the above-described second step. Thereafter, the second porous glass body is formed on the outer surface of the elongated intermediate preform 53 (fine glass particles are generated in the flame from a burner 900 by hydrolytic reaction of the source gas supplied from a gas supply system 600 and deposited oh the outer surface of the elongated intermediate preform 53), as shown in FIG. 9, thereby obtaining the second composite preform 54.

In this step as well, the obtained second composite preform 54 is sintered in an atmosphere containing a fluorine raw material, as in the above-described second step, thereby finally obtaining the optical fiber preform 55 (FIGS. 10 and 11). In particular, in this third step as well, the contents of fluorine is adjusted by changing the supply amount of the fluorine raw material between the heating process and the process of making the preform transparent, as shown in FIG. 15. Therefore, the fluorine concentration in the preform glass region corresponding to the inner cladding 180 lowers in the radial direction from the inner region to the peripheral region (the refractive index of the glass region increases in the radial direction).

The optical fiber preform 55 manufactured by the above processes comprises an inner core glass 100 corresponding to the inner core 160 of the optical fiber 150, an outer core glass 200 corresponding to the outer core 170, an inner cladding glass 300 corresponding to the inner cladding 180, and an outer cladding glass 400 corresponding to the outer cladding 190, as shown in FIG. 12.

In the second -embodiment as well, in the final step (FIG. 12), the optical fiber preform 55 having the above structure is drawn while heating one end of the optical fiber preform 55 using a heater 950, thereby obtaining the optical fiber 150 having an outer diameter of 125 μm shown in FIG. 13.

The characteristics of the optical fibers obtained in the first and second embodiments will be described next.

Composition

The compositions of the first and second embodiments are as follows.

Inner core: $SiO_2+GeO_2+Cl$
Outer core: $SiO_2+Cl$
Inner cladding: $SiO_2+F+Cl$
Outer cladding: $SiO_2+F$ Refractive Index Profile The refractive index profile of the first embodiment is designed as follows.

$\Delta n_a=(n_1-n_2)/n_2$: 0.85%
$\Delta n_b=(n_3-n_2)/n_2$: −0.25%
$\Delta n_c=(n_4-n_2)/n_2$: −0.1% where $\Delta n_a$ is the relative refractive index difference between the inner core 10 and the outer core 20; $\Delta n_b$ is the relative refractive index difference between the inner cladding 30 and the outer core 20; and $\Delta n_c$ is the relative refractive index difference-between the outer cladding 40 and the outer core 20.

The refractive index profile of the second embodiment is designed as follows.

$\Delta n_a=(n_1-n_2)/n_2$: 0.85%
$\Delta n_{b1}=(n_{3a}-n_2)/n_2$: −0.25%
$(\Delta n_{b2}=(n_{3b}-n_2)/n_2$: −0.2%)
$\Delta n_{c1}=(n_{4a}-n_2)/n_2$: −0.1%
$(\Delta n_{c2}=(n_{4b}-n_2)/n_2$: −0.07%)

where $\Delta n_a$ is the relative refractive index difference between the inner core 160 and the outer core 170; $\Delta n_{b1}$ is the relative refractive index difference between the inner cladding 180 (inner region) and the outer core 170; $\Delta n_{b2}$ is the relative refractive index difference between the inner cladding 180 (peripheral region) and the outer core 170; $\Delta n_{c1}$ is the relative refractive index difference between the outer cladding 190 (inner region) and the outer core 170; and $\Delta n_{c2}$ is the relative refractive index difference between the outer cladding 190 (peripheral region) and the outer core 170.

Dimensions

The dimensions of the first and second embodiment are as follows.

The ratio of the outer diameter b of the outer core to the outer diameter a of the inner core (b/a): 10

The ratio of the outer diameter c of the inner cladding to the outer diameter b of the outer core (c/b): 2

The ratio of the outer diameter d of the outer cladding to the outer diameter c of the inner cladding (d/c): 2.1 where b/a is the ratio of the outer diameter b of the outer core to the outer diameter a of the inner core; c/b, the ratio of the outer diameter c of the inner cladding to the outer diameter b of the outer core (c/b); and d/c, the ratio of the outer diameter d of the outer cladding to the outer diameter c of the inner cladding. The outer diameter of the outer core 20 at this time was 29 μm.

In both embodiments, the MFD of the resultant optical fiber was 9.8 μm; the cutoff wavelength at a reference length of 2 m was 1.68 Hm; and the zero-dispersion wavelength was 1.58 μm.

For a dispersion-shifted fiber selected for optical transmission in the 1.55-μm wavelength band, a cutoff wavelength of 1.55 μm or less, which is shorter than the signal light wavelength for a reference length of 2 m (measurement based on CCITT-G.653), is normally selected.

When the reference length for general evaluation of the cutoff wavelength is as short as 2 m, not only the fundamental mode of transmission light but also a higher-order mode propagate through the dispersion-shifted fiber. In the present invention, the cutoff wavelength is longer than the signal light wavelength (1.55 μm). However, the higher-order mode attenuates during propagation in the dispersion-shifted fiber at a higher rate as compared to the fundamental mode, so the higher-order mode becomes sufficiently smaller than the fundamental mode if the propagation length is several km. Therefore, when the propagation distance is as long as hundred to several thousand km, like a submarine communication cable, the higher-order mode poses no problem.

In the manufacturing methods of the first and second embodiments, the porous glass body (first porous glass body) is directly formed on the outer surface of the core glass preform 51. The present inventors confirmed about the optical fiber of each embodiment that a magnitude $\Delta\alpha_{1.38}$ of the absorption peak for 1.38-μm light, which represented the influence of OH absorption, was relatively as small as 0.8 dB/km, and its influence on the signal light wavelength band was small.

The present inventors also confirmed that both optical fibers obtained by the manufacturing methods of the first and second embodiments had a satisfactory transmission loss of 0.22-dB/km for 1.55-μm light.

As has been described above, the optical fiber 1 of the first embodiment is a dispersion-shifted fiber having a depressed cladding type profile in which the outer diameter of the outer core is as large as 25 to 40 μm, so a larger MFD can be realized.

When the outer diameter of the outer core is set to be large, vapor phase synthesis such as VAD or OVD can be repeatedly used to manufacture the preform (particularly, to form the first and second porous glass bodies).

According to the second embodiment, the following effects can be obtained in addition to the effects of the first embodiment. In the process of manufacturing the preform regions as prospective inner and outer claddings, the concentration of the fluorine raw material contained in the atmosphere when heating (process of impregnating the porous glass body with fluorine) the first or second composite preform is set to be higher than that in the atmosphere when making the first or second composite preform transparent. When the fluorine concentration is lowered in the radial direction from the inner region to the peripheral region in the glass region of each of the inner and outer claddings of the resultant optical fiber (refractive index increases), bubble formation in the preform or deformation of the preform itself can be prevented. In addition, deformation in the heating process or flaws on the preform surface during the manufacture or on the surface of the resultant optical fiber can be effectively prevented.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber containing silica glass, comprising:

a first core having a predetermined refractive index;

a second core around an outer periphery of said first core and having a refractive index lower than that of said first core and an outer diameter of 25–40 μm;

a first cladding around an outer periphery of said second core and having a refractive index lower than that of said second core; and a second cladding around an outer periphery of said first cladding and having a refractive index higher than that of said first cladding and lower than that of said second core; wherein:

said first core comprises a glass region containing at least germanium dioxide;

said second core comprises a glass region which is not doped with germanium dioxide and is not doped with fluorine;

said first cladding comprises a glass region containing at least fluorine; and said second cladding comprises a glass region containing fluorine.

2. A fiber according to claim 1, wherein said first core, said second core, and said first cladding contain chlorine.

3. A fiber according to claim 2, wherein said second cladding contains chlorine.

4. A fiber according to claim 2, wherein a chlorine content in said first cladding is lower than that in said first and second cores.

5. A fiber according to claim 1, wherein the refractive index of said first cladding increases in a radial direction from an inner side thereof toward a peripheral side thereof, and the refractive index of said second cladding increases in a radial direction from an inner side thereof toward a peripheral side thereof.

6. A fiber according to claim 5, wherein said first and second claddings contain fluorine as a dopant for adjusting the refractive index.

7. A method of manufacturing said optical fiber of claim 1, comprising:

the first step of forming, by vapor phase synthesis, a porous preform whose central portion along a longitudinal direction corresponds to said first core and whose peripheral portion around said central portion corresponds to said second core;

the second step of sintering said porous preform to obtain a core glass preform;

the third step of elongating said core glass preform to a desired outer diameter and depositing a first porous glass body corresponding to said first cladding on an outer surface of said elongated core glass preform by vapor phase synthesis to obtain a first composite preform;

the fourth step of sintering said first composite preform in an atmosphere containing a fluorine raw material to obtain an intermediate preform;

the fifth step of elongating said intermediate preform to a desired outer diameter and depositing a second porous glass body corresponding to said second cladding on an outer surface of said elongated intermediate preform by vapor phase synthesis to obtain a second composite preform;

the sixth step of sintering said second composite preform to obtain an optical fiber preform; and the seventh step of drawing said optical fiber preform while heating one end of said optical fiber preform.

8. A method according to claim 7, wherein, in the seventh step, said optical fiber preform is drawn such that an outer diameter of said second core of a resultant optical fiber falls within a range of 25 to 40 $\mu$m.

9. A method according to claim 7, further comprising:

a first heating process provided between the first and second steps, said first heating process heating said porous preform, obtained in the first step, in an atmosphere containing a halogen gas; and a second heating process provided between the third and fourth steps, said second heating process heating said first composite preform, obtained in the third step, in an atmosphere containing a halogen gas.

10. A method according to claim 9, wherein the halogen gas contains $SiCl_4$.

11. A method according to claim 9, further comprising:

a third heating process provided between the fifth and sixth steps, said third heating process heating said second composite preform, obtained in the fifth step, in an atmosphere containing a halogen gas.

12. A method according to claim 7, wherein, in the sixth step, said second composite preform is sintered in an atmosphere containing a fluorine raw material.

13. A method according to claim 7, wherein, in the fifth step, said second porous glass body is deposited on said outer surface of said intermediate preform while supplying a fluoride gas.

14. An optical fiber containing silica glass, comprising:

a first core having a predetermined refractive index;

a second core provided around an outer periphery of said first core and having a refractive index lower than that of said first core, where said second core is not doped with fluorine;

a first cladding provided around an outer periphery of said second core and having a refractive index lower than that of said second core, the refractive index of said first cladding increasing in a radial direction from an inner side thereof toward a peripheral side thereof; and a second cladding provided around an outer periphery of said first cladding and having a refractive index higher than that of said first cladding, the refractive index of said second cladding increasing in a radial direction from an inner side thereof toward a peripheral side thereof.

15. A fiber according to claim 14, wherein said first and second claddings contain at least fluorine as a dopant for adjusting the refractive index.

16. A fiber according to claim 15, wherein said first core comprises a glass region containing at least geranium dioxide, and said second core comprises a glass region containing only chlorine as a dopant.

17. A method of manufacturing said optical fiber of claim 14, comprising:

the first step of forming, by vapor phase synthesis, a porous preform whose central portion along a longitudinal direction corresponds to said first core and whose peripheral portion around said central portion corresponds to said second core, and sintering said porous preform to obtain a core glass preform;

the second step of elongating said core glass preform to a desired outer diameter, heating, in an atmosphere containing a fluorine material having a predetermined concentration at a predetermined temperature, a first composite preform obtained by depositing a first porous glass body corresponding to said first cladding on an outer surface of said elongated core glass preform by vapor phase synthesis, and making said first composite preform transparent after the atmosphere temperature is increased and the concentration of the fluorine material contained in the atmosphere is changed, thereby obtaining an intermediate preform; and the third step of elongating said intermediate preform to a predetermined outer diameter, heating, in an atmosphere containing a fluorine material having a predetermined concentration at a predetermined temperature, a second composite preform obtained by depositing a second porous glass body corresponding to said second cladding on an outer surface of said elongated intermediate preform by vapor phase synthesis, and making said second composite preform transparent after the atmosphere temperature is increased and the concentration of the fluorine material contained in the atmosphere is changed, thereby obtaining an optical fiber preform.

18. A method according to claim 17, wherein, in the second step, the concentration of the fluorine material in the atmosphere when heating said first composite preform is set to be higher than that in the atmosphere when making said first composite preform transparent, and in the third step, the concentration of the fluorine material when heating said second composite preform is set to be higher than that when making said second composite preform transparent.

* * * * *